(12) United States Patent
Hou

(10) Patent No.: US 11,313,789 B2
(45) Date of Patent: Apr. 26, 2022

(54) MEASUREMENT SYSTEM BASED ON OPTICAL INTERFERENCE AND MEASURING METHOD USING SAME

(71) Applicant: HON HAI PRECISION INDUSTRY CO., LTD., New Taipei (TW)

(72) Inventor: Li-Shing Hou, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 17/002,080

(22) Filed: Aug. 25, 2020

(65) Prior Publication Data

US 2021/0247298 A1 Aug. 12, 2021

(30) Foreign Application Priority Data

Feb. 12, 2020 (CN) .......................... 202010089032.9

(51) Int. Cl.
| | | |
|---|---|---|
| G01N 21/27 | (2006.01) | |
| G01B 9/02 | (2006.01) | |
| G01N 21/45 | (2006.01) | |
| G02B 27/10 | (2006.01) | |
| G02B 27/28 | (2006.01) | |
| G01B 9/02015 | (2022.01) | |

(52) U.S. Cl.
CPC ....... *G01N 21/276* (2013.01); *G01B 9/02016* (2013.01); *G01N 21/45* (2013.01); *G02B 27/10* (2013.01); *G02B 27/283* (2013.01)

(58) Field of Classification Search
CPC .... G01N 21/276; G01N 21/45; G02B 27/283; G02B 27/10; G01B 9/02016; G01B 9/08
See application file for complete search history.

(56) References Cited

U.S. PATENT DOCUMENTS

| | | | | |
|---|---|---|---|---|
| 5,357,341 A | * | 10/1994 | Kuchel | G01B 9/02007 356/520 |
| 2012/0300213 A1 | * | 11/2012 | Frankovich | G01B 11/161 356/450 |
| 2019/0113436 A1 | * | 4/2019 | Wagner | G01N 21/39 |
| 2019/0187042 A1 | * | 6/2019 | Wagner | G01N 15/00 |
| 2019/0391014 A1 | * | 12/2019 | Stevenson | G01N 21/25 |

* cited by examiner

*Primary Examiner* — Violeta A Prieto
(74) *Attorney, Agent, or Firm* — ScienBiziP, P.C.

(57) ABSTRACT

A measurement system includes a light source configured to emitting a source light, a detection platform configured to support a reference sample and a test sample; a light guiding element on an optical path of the source light; and a detector. The detection platform is configured to synchronously move the reference sample and the test sample on a same surface of the detection platform. The light guiding element is configured to divide the source light into a measurement light and a reference light and guide the measurement light to the test sample, and the reference light to the reference sample. The measurement light reflected by the test sample and the reference light reflected by the reference sample are combined as an interference light. The detector is configured to receive the interference light and obtain optical information of the test sample according to the interference light.

12 Claims, 3 Drawing Sheets

MEASUREMENT SYSTEM BASED ON OPTICAL INTERFERENCE AND MEASURING METHOD USING SAME

FIELD

The subject matter herein generally relates to a field of optical measurement, particularly relates to a measurement system based on optical interference and a measurement method based on optical interference.

BACKGROUND

Interferometers are widely used for measuring lens surface, refractive index, and other optical characteristics or states. A conventional interferometer needs to move (such as rotating or translating) and emit light to a specific position on a test sample during a measurement process, and the light reflected is detected and analyzed. In the measurement process, the test sample also needs to move with the movement of the interferometer. However, a coordination accuracy between the movement of the interferometer and the movement of the test sample is low, so that after any movement, the reflected light is misaligned at a specific position on the test sample, such that measurement accuracy is reduced.

Therefore, there is room for improvement in the art.

BRIEF DESCRIPTION OF THE DRAWINGS

Implementations of the present technology will now be described, by way of embodiments only, with reference to the attached figures.

DETAILED DESCRIPTION

Figure 1:
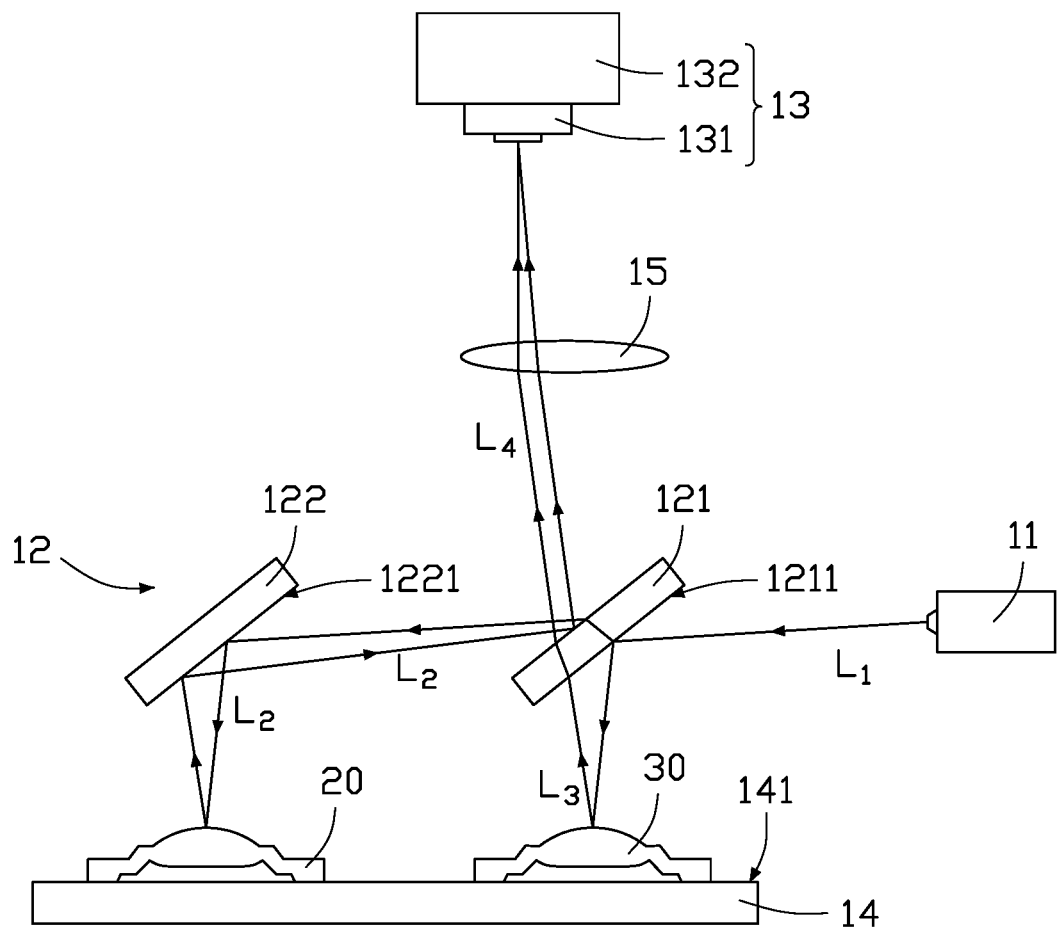
FIG. 1 is a schematic view of a measurement system according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as coupled, whether directly or indirectly through intervening components, and is not necessarily limited to physical connections. The connection can be such that the objects are permanently coupled or releasably coupled. The term "comprising" when utilized, means "including, but not necessarily limited to"; it specifically indicates open-ended inclusion or membership in the so-described combination, group, series, and the like.

FIG. 1 illustrates a measurement system 10. The measurement system 10 is used to measure optical characteristics of a test sample 20. In this embodiment, the test sample 20 is an optical lens applied in a camera lens of an electronic device, and the optical information to be measured is a morphology of a surface of the test sample 20. In other embodiments, the test sample 20 may be, for example, a polished silicon wafer, a wafer, a metal shell of a mobile phone, a turbine blade, etc. The optical information includes but is not limited to a refractive index and a thickness of the test sample 20. When the measurement system 10 is working, it is necessary to set a reference sample 30 to obtain the optical information of the test sample 20.

As shown in FIG. 1, the measurement system 10 includes a light source 11, a light guiding element 12, a detector 13, and a detection platform 14.

The light source 11 is used to emit source light $L_1$. In this embodiment, the light source 11 is a laser for emitting laser, and the source light $L_1$ is a laser. In other embodiments, the light source 11 is not a laser and emits white light. However, the laser light source has a higher monochromaticity and a faster measuring speed in comparison with a white light source, which is beneficial to save measurement time, and the laser light source can effectively reduce the data processing complexity of the detector 13.

The light guiding element 12 is arranged on the optical path of the source light $L_1$. The light guiding element 12 divides the source light $L_1$ into a measurement light $L_2$ and a reference light $L_3$ and guides the measurement light $L_2$ to the test sample 20. The light guiding element 12 also guides the reference light $L_3$ to the reference sample 30.

As shown in FIG. 1, the light guiding element 12 includes a beam splitter 121 and a reflector 122. Both the beam splitter 121 and the reflector 122 are flat mirrors. The beam splitter 121 and the reflector 122 are spaced apart from each other and parallel to each other. The beam splitter 121 is arranged on an optical path of the source light $L_1$ and is configured to receive the source light $L_1$ and divide the source light $L_1$ into the measurement light $L_2$ and the reference light $L_3$. In this embodiment, the beam splitter 121 has a first light-incident surface 1211. When the source light $L_1$ is incident on the first light-incident surface 1211, a portion of the source light $L_1$ is reflected by the first light-incident surface 1211 and is guided to the reference sample 30 as the reference light $L_3$ Another portion of the source light $L_1$ passes through the light-incident surface 1211 and is guided to the reflector 122 as the measurement light $L_2$. The reflector 122 is arranged on an optical path of the measurement light $L_2$ and is configured to guide the measurement light L2 to the test sample 20. In this embodiment, the reflector 122 has a second light-incident surface 1221. The second light-incident surface 1221 is configured to reflect the measurement light $L_2$ toward the test sample 20 when the measurement light $L_2$ is guided to the second light-incident surface 1221 by the beam splitter 121.

As shown in FIG. 1, the measurement light $L_2$ incident on the test sample 20 may be reflected by the test sample 20 back to the reflector 122. The reflector 122 is configured to reflect the measurement light $L_2$ reflected back by the test sample 20 to the beam splitter 121. The reference light L3 incident on the reference sample 30 may be reflected by the reference sample 30 back to the beam splitter 121. The beam splitter 121 is also configured to combine the reference light $L_3$ reflected by the reference sample 30 and the measurement light $L_2$ reflected back by the reflector 122 to be an interference light $L_4$ received by the detector 13.

As shown in FIG. 1, the measurement system 10 further includes a focusing lens 15. The focusing lens 15 is arranged between the light guiding element 12 and the detector 13. Specifically, the focusing lens 15 is arranged between the beam splitter 121 and the detector 13. The focusing lens 15 is used to accurately focus the interference light $L_4$ to the detector 13.

Referring to FIG. 1, the detector 13 includes a detecting lens 131 and a processor 132 electrically connected to the detecting lens 131. The detecting lens 131 is configured for receiving the interference light $L_4$ and generating an interference image according to the interference light $L_4$. The processor 132 is configured to obtain optical information corresponding to the test sample 20 according to the characteristics of the interference image by a preset calculation rule.

The detection platform 14 is used to support the reference sample 30 and the test sample 20. Both the reference sample 30 and the test sample 20 are fixed on a surface 141 of the detection platform 14, and the surface 141 of the detection platform 14 is a flat surface. The reference sample 30 and the test sample 20 are separated from each other by a predetermined distance. The detection platform 14 can move in a plane where the surface 141 is located. When the detection platform 14 moves, both the reference sample 30 and the test sample 20 move synchronously with the detection platform 14. During movement of the detection platform 14, relative positions of the reference sample 30 and the test sample 20 do not change. In this embodiment, the detection platform 14 can move under the control of the processor 132. In other embodiments, the movement of the detection platform 14 can be controlled by an external motor (not shown).

The measurement system 10 provided in this embodiment can be used to detect the consistency of the quality of multiple products of a same model (especially multiple products of the same model produced in one batch). The measurement system 10 is used to detect differences between various properties of multiple products of the same model, such as differences in surface morphology and differences in refractive indices. The greater the differences, the poorer the consistency of quality.

In this embodiment, the test sample 20 and the reference sample 30 are optical lenses of a same model or optical lenses of the same model produced in one batch. Ideally, the various optical properties (such as surface morphology) of the test sample 20 and the reference sample 30 should be exactly the same. But due to production errors, the various optical properties between the test sample 20 and the reference sample 30 may have differences. One of a plurality of optical lenses of the same model is selected as the test sample 20, various optical characteristics of the test sample 20 are measured, and the remaining multiple optical lenses are used as the reference samples 30. The test sample 20 is fixed on the surface 141 of the detection platform 14, and the remaining reference samples 30 are fixed on the surface 141 of the detection platform 14 one by one, in order to sequentially measure differences of the optical characteristics (such surface morphology) between the test sample 20 and each of the multiple reference samples 30. Each reference sample 30 is sequentially fixed at a same position on the surface 141 of the detection platform 14 in a same direction so as to facilitate measurement.

The following describes a method for the process of measurement when the measurement system 10 measures one of the reference samples 30.

This disclosure also provides a measuring method based on optical interference and applied with the measurement system 10. The method includes the following steps. The measuring method is provided by way of example, as there are a variety of ways to carry out the method. The exemplary method can begin at step S1.

Step S1: emitting a source light.

Step S2: dividing the source light into measurement light and reference light, and guiding the measurement light to the test sample and the reference light to the reference sample.

Step S3: moving the detection platform to synchronously move the test sample and the reference sample, and synchronously rotating the light source, the light guiding element, and the detector, such that the reference light is incident on different positions on the reference sample at different times. The measurement light is incident on different positions on the test ample at different times; and the measurement light reflected by the test sample and the reference light reflected by the reference sample are combined as interference light.

Step S4: receiving the interference light and obtaining optical information of the test sample according to the interference light.

In the step S1, when the measurement system 10 is powered on, the light source 11 is powered on, and the light source 11 emits source light $L_1$. In step S2, the source light $L_1$ is incident on the first light-incident surface 1211 of the beam splitter 121, and the first light incident surface 1211 reflects a portion of the source light $L_1$ to the reference sample 30. This becomes the reference light $L_3$, and the other portion of the source light $L_1$ passes through the first light incident surface 1211 to the test sample 20, this part of the light is the measurement light $L_2$. The reflector 122 receives and reflects the measurement light $L_2$ to the test sample 20.

Both the measurement light L2 and the reference light L3 are laser. At one time, the spot position of the measurement light L2 on the test sample 20 is the same as the spot position of the reference light $L_3$ on the reference sample 30 to compare optical characteristics of the same position on the test sample 20 and the reference sample 30.

Figure 3:
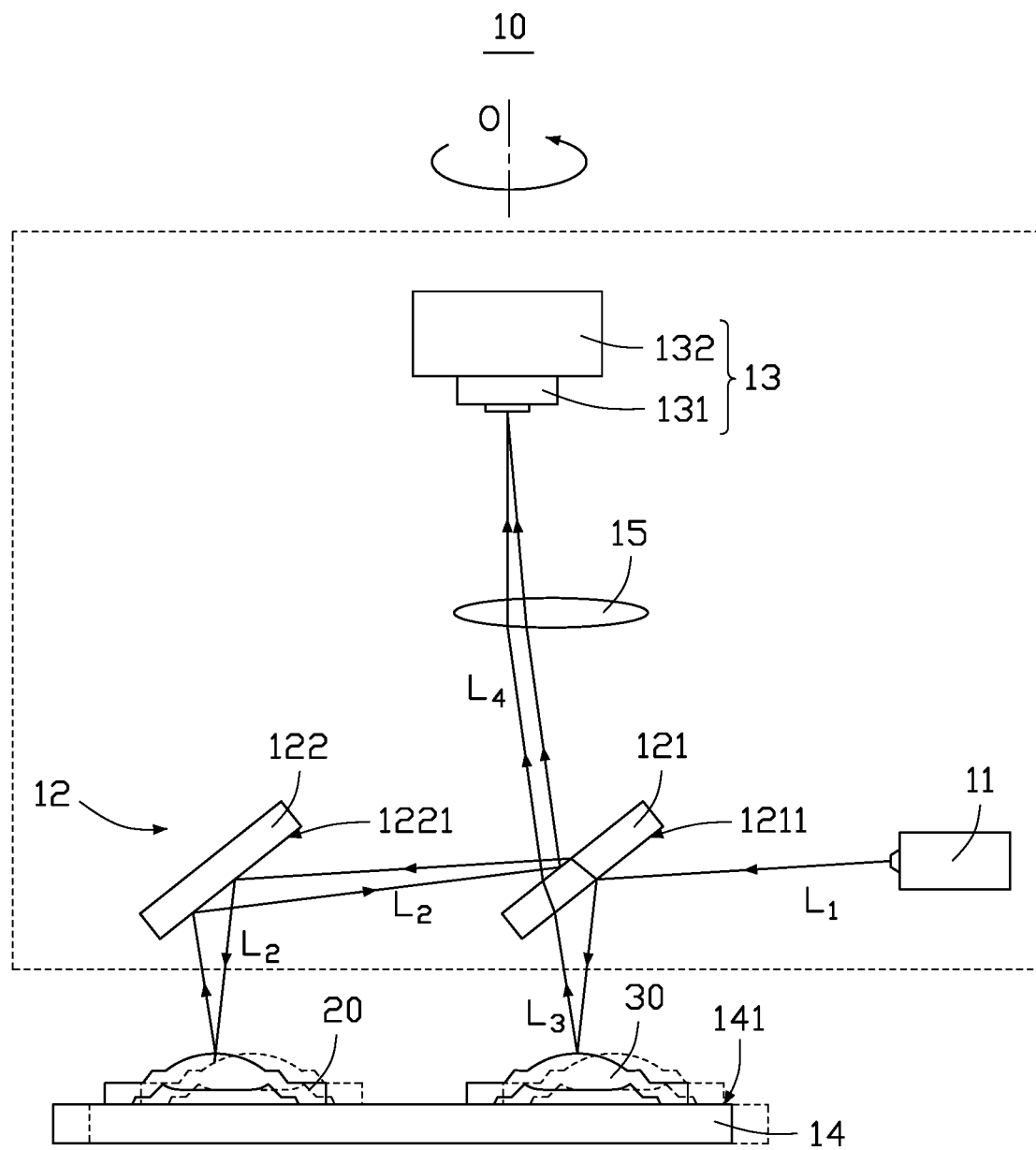
FIG. 3 is a view showing a working state of the measurement system of FIG. 1.

In the step S3, referring to FIG. 3, the light source 11, the light guiding element 12, the detector 13, and the focusing lens 15 are moved synchronously. The plane in which the reference sample 30 and the test sample 20 are located (that is the plane of the surface 141 of the detection platform 14) is defined as a detection plane. The light source 11, the light guiding element 12, the detector 13, and the focusing lens 15 rotate synchronously around a target axis O that is perpendicular to the detection plane. In addition, the detection platform 14 drives the reference sample 30 and the test sample 20 to move synchronously on the detection plane. The synchronous rotation of the light source 11, the light guiding element 12, the detector 13, and the focusing lens 15 and the synchronous moving of the reference sample 30 and the test sample 20 cause the measurement light $L_2$ to irradiate different positions of the test sample 20 at different times. The reference light $L_3$ irradiates different positions of the reference sample 30.

The measurement light $L_2$ is reflected by the test sample 20 and then is reflected by the reflector 122 to the beam splitter 121, and the reference light $L_3$ is also reflected by the reference sample 30 back to the beam splitter 121. The measurement light $L_2$ reflected by the test sample 20 and the reference light $L_3$ reflected by the reference sample 30 are emitted from the same light source 11, so the measurement light $L_2$ and the reference light $L_3$ have a same frequency, a same vibration direction, and a constant phase difference. That is, the interference condition is satisfied, and the measurement light $L_2$ and the reference light $L_3$ are combined at the beam splitter 121 and interfere with each other to form an interference light $L_4$. The interference light $L_4$ is guided to the focusing lens 15 by the beam splitter 121 and then focused on the detecting lens 131 by the focusing lens 15.

Figure 2:
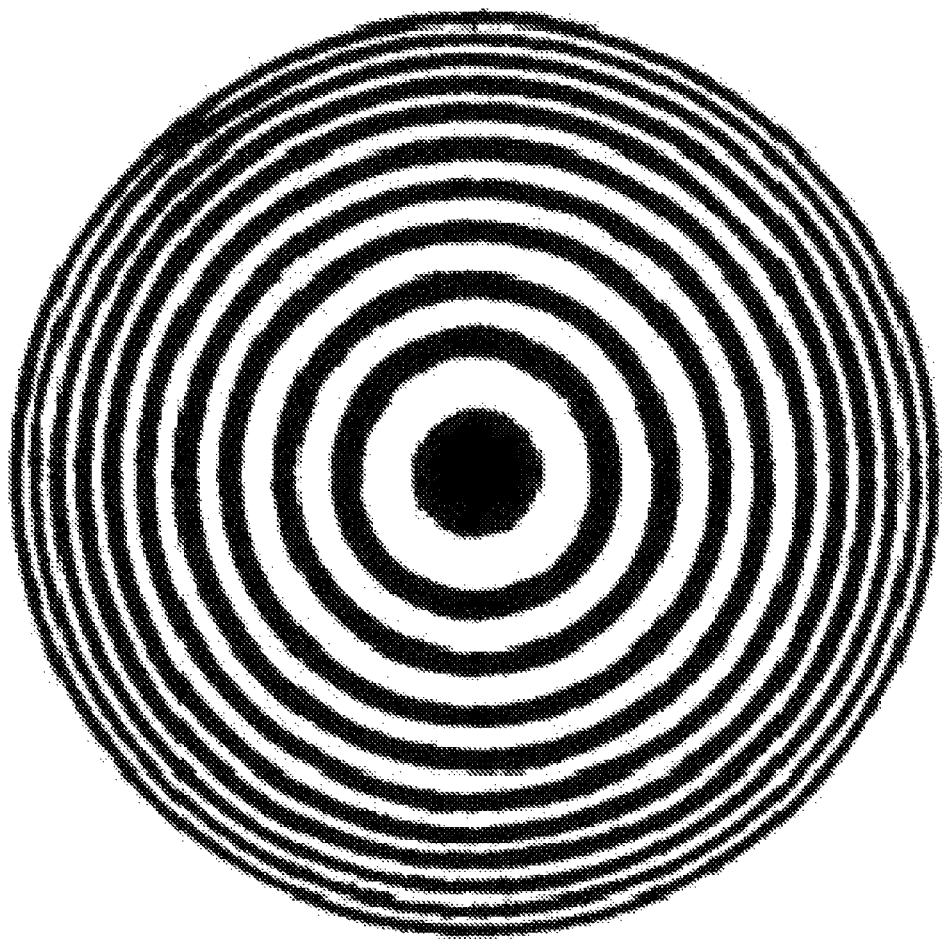
FIG. 2 is a planar view of an interference image formed by interference light in the measurement system of FIG. 1.

In the step S4, the detecting lens 131 receives the interference light $L_4$, and generates the interference image based on the interference light $L_4$. The interference image is a fringe image with alternating light fringes and dark fringes, as shown in FIG. 2. The processor 132 can obtain optical information of the position irradiated by the spot of the reference light $L_3$ on the reference sample 30 by a preset calculation process according to the fringe features in the interference image.

The measurement system 10 detects optical characteristics of multiple reference samples 30 in sequence by repeating the above-mentioned working process. During the working process of the measurement system 10, due to the accuracy of the measurement system 10 itself, the movement of the detection platform 14 may have a moving distance error, and the synchronous rotation of the light source 11, the light guiding element 12, the detector 13, and the focusing lens 15 may have a rotation angle error. The influence of a moving distance error and a rotation angle error, especially when combined, may cause the spot position of the measurement light $L_2$ on the test sample 20 to shift, and also cause the spot position of the reference light $L_3$ on the reference sample 30 to shift. The aforementioned shift of the spot position can cause errors in the interference image generated by the detecting lens 131.

In the measurement system 10 in the disclosure, relative positions of the reference sample 30 and the test sample 20 remain unchanged during the working process of the measurement system 10, by setting the reference sample 30 and the test sample 20 to move synchronously. The relative positions of the reference sample 30 and the test sample 20 being unchanged ensures that the shift of the spot position on the test sample 20 caused by the moving distance error and rotation angle error to be synchronized with the shift of the spot position on the reference sample 30. The amount and direction of any shift of the spot position on the test sample 20 are the same as those applying to the reference sample 30. Since the measurement system 10 is used to obtain the optical characteristics differences between the test sample 20 and the reference sample 30, the shift amount and direction of the spot position on the test sample 20 are the same as the shift amount and direction of the spot position on the reference sample 30, thus the measured optical characteristics differences between the test sample 20 and the reference sample 30 will not be affected. Therefore, the measurement system 10 provided in this embodiment improves measurement accuracy.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A measurement system based on optical interference, comprising:
   a light source configured to emitting a source light;
   a detection platform, the detection platform configured to support a reference sample and a test sample spaced apart from each other on a same surface of the detection platform, the detection platform also configured to synchronously move the reference sample and the test sample by moving itself;
   a light guiding element on an optical path of the source light, the light guiding element configured to divide the source light into a measurement light and a reference light and guide the measurement light to the test sample, and guide the reference light to the reference sample, the measurement light reflected by the test sample and the reference light reflected by the reference sample combining as an interference light; and
   a detector, the detector configured to receive the interference light and obtain optical information of the test sample according to the interference light.

2. The measurement system of claim 1, wherein the source light is a laser.

3. The measurement system of claim 1, wherein the light guiding element comprises a beam splitter and a reflector; the beam splitter and the reflector are spaced apart from each other and parallel to each other.

4. The measurement system of claim 3, wherein the beam splitter is configured to divide the source light into the measurement light and the reference light; and guide the measurement light to the reflector and the reference light to the reference sample.

5. The measurement system of claim 4, wherein the reflector is configured to guide the measurement light to the reference sample and guide the measurement light reflected by the test sample to the beam splitter.

6. The measurement system of claim 5, wherein the beam splitter is configured to transmit a portion of the source light as the measurement light and reflect other portion of the source light as the reference light.

7. The measurement system of claim 1, wherein the detector comprises a detecting lens and a processor electrically connected to the detecting lens; the detecting lens is configured for receiving the interference light and generating an interference image according to the interference light; the processor is configured to obtain optical information of the test sample according to the interference image.

8. The measurement system of claim 1, further comprising: a focusing lens between the light guiding element and the detector; wherein the focusing lens is configured to focus the interference light to the detector.

9. The measurement system of claim 1, wherein the light source, the light guiding element, and the detector are synchronously rotated when the measurement system is working.

10. The measurement system of claim 9, wherein the light source, the light guiding element, and the detector are synchronously rotated around a target axis, the target axis is perpendicular to the surface of the detection platform where the reference sample and the test sample are located.

11. A measuring method based on optical interference, comprising:
   emitting a source light;
   dividing the source light into a measurement light and a reference light, and guiding the measurement light to a test sample and the reference light to a reference sample;
   moving a detection platform to synchronously move the test sample and the reference sample on a same surface of the detection platform, and synchronously rotating a light source, a light guiding element, and a detector, such that the reference light incidents on different positions on the reference sample at different times, the measurement light incidents on different positions on the test sample at different times; and the measurement light reflected by the test sample and the reference light reflected by the reference sample combining as an interference light; and receiving the interference light and obtaining optical information of the test sample according to the interference light.

12. The measuring method of claim 11, wherein synchronously rotating the light source, the light guiding element, and the detector comprises synchronously rotating the light source, the light guiding element, and the detector around a target axis, the target axis is perpendicular to the surface of the detection platform where the reference sample and the test sample are located.

* * * * *